Aug. 3, 1937.  F. L. MOSELEY  2,088,659
PHASE SHIFT CONTROL FOR THREE ELEMENT ELECTRON TUBES
Filed July 8, 1933  2 Sheets-Sheet 1
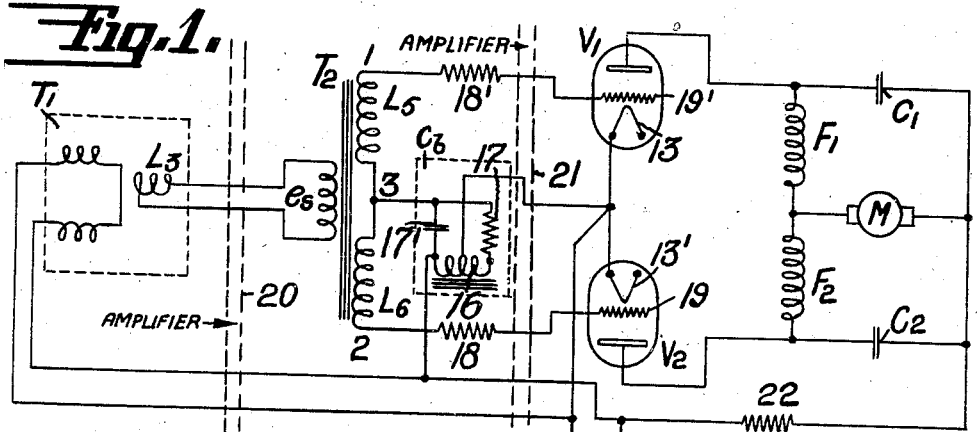
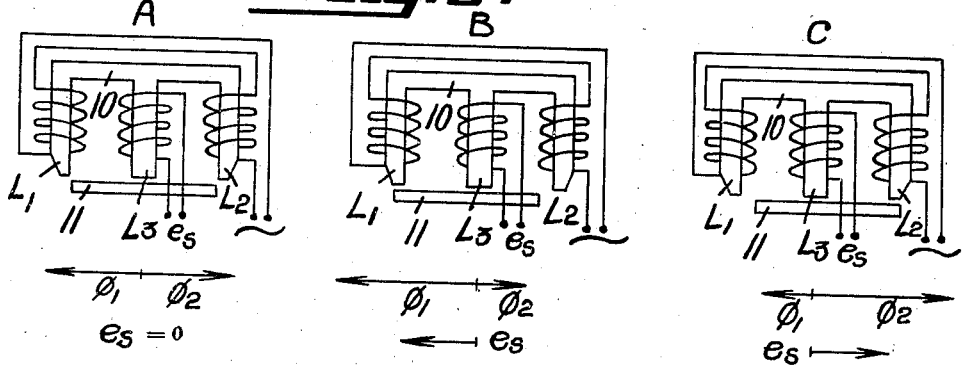
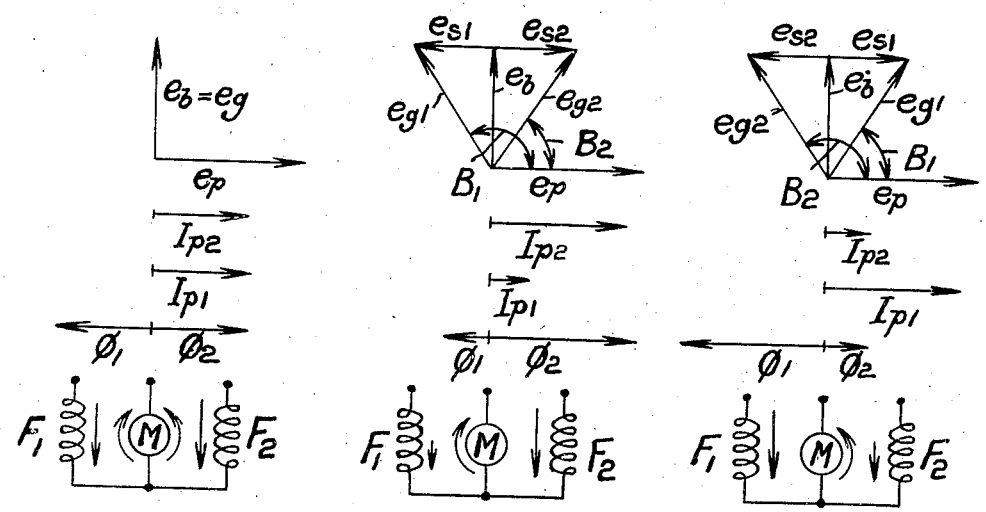
INVENTOR
FRANCIS L. MOSELEY.
BY
Herbert H. Thompson
HIS ATTORNEY.

Aug. 3, 1937.  F. L. MOSELEY  2,088,659
PHASE SHIFT CONTROL FOR THREE ELEMENT ELECTRON TUBES
Filed July 8, 1933  2 Sheets-Sheet 2

INVENTOR
FRANCIS L. MOSELEY.
BY
HIS ATTORNEY.

Patented Aug. 3, 1937

2,088,659

UNITED STATES PATENT OFFICE 2,088,659

PHASE SHIFT CONTROL FOR THREE ELEMENT ELECTRON TUBES

Francis L. Moseley, Brooklyn, N. Y., assignor to Sperry Gyroscope Company, Inc., Brooklyn, N. Y., a corporation of New York Application July 8, 1933, Serial No. 679,589
In Great Britain January 11, 1933

8 Claims. (Cl. 172—239)

This invention relates to the graduated control of the phase on grid of three element electron or thermionic tubes such as grid controlled gas filled rectifier tubes by which the output is smoothly and readily varied both in magnitude and direction. One application of my system lies in the positional control of objects by such tubes and has application to so-called follow-up systems and remote control systems for rotary objects by means of reversible electric motors. Such a system is best controlled by dynamically and progressively shifting the phase on the grid of the grid-glow tube or tubes and one object of the present invention is to provide a means of obtaining dynamic phase shift without the use of complex bridges or similar circuits. A further object is to secure the simultaneous graduated control of two grid-glow tubes in a push-pull fashion, so that as the rectified output of one is increased the output of the other is decreased.

Although the present invention is herein shown as applied to a follow-up system for gyro compasses and the like, it is not intended that it be limited thereto inasmuch as certain modifications and changes may be made without departing from the original spirit of the invention or the scope of the appended claims.

Referring to the drawings,

Fig. 1 is a schematic wiring diagram showing the general principles of my invention.

Fig. 2 is a series of wiring and vector diagrams illustrating the mode of operation.

Figure 3:
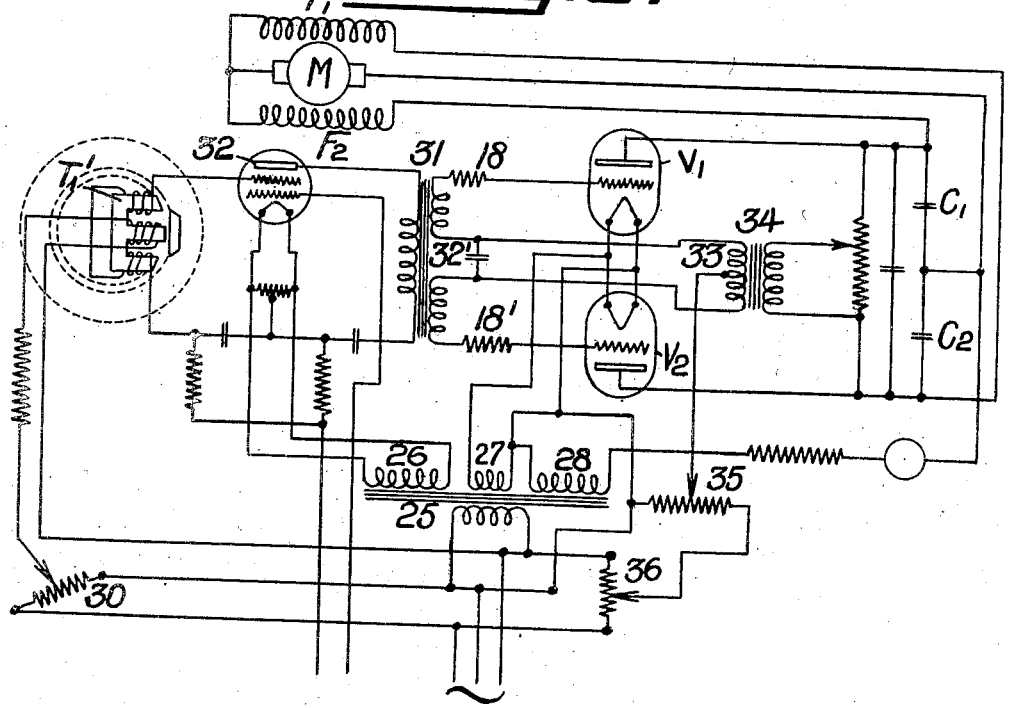
Fig. 3 shows one application of my invention wherein the present invention is used to control a double wound reversible D. C. motor as part of a follow-up system for a gyro compass.

At the controlling or sending element is placed some means for transmitting a voltage depending upon relative displacement between the sending and receiving or following elements. A simple form of such a transmitter may comprise a variable gap or variable flux transformer $T_1$. As shown, one portion 10 of said transformer comprises three legs and is preferably mounted on the following element, while the other portion 11, which is mounted on the sensitive or sending element, comprises merely a strip of soft iron. The windings may all be placed on the member 10 if desired and alternating current may be supplied to either the central winding as shown in Fig. 3 or to the two opposite outer windings $L_1$ and $L_2$ as shown in Figs. 1 and 2. In either case it will be evident that as 11 is moved with respect to $L_1$ and $L_2$, A. C. signal voltages $e_s$ are generated of variable magnitude and direction or sign (reversible phase position). When 11 is positioned as shown in Fig. 2A, that is, centrally, the output $e_s$ is zero, but when it is moved in either direction as shown in Fig. 2B, a voltage will be induced in $L_3$. The phase (direction) of this induced voltage will be determined by whichever flux $\phi_1$, $\phi_2$ (from $L_1$ or $L_2$) predominates but there is no graduated shift of phase but merely a reversal as the resultant voltage passes through zero. The magnitude $e_s$ will be dependent on the difference of said fluxes. Thus when element 11 is moved to the right, as shown in Fig. 2C, the voltage $e_s$ is of opposite phase to that in Fig. 2B.

The voltage $e_s$ induced in $L_3$ is communicated to a suitable transformer coupler $T_2$, preferably having two secondary windings $L_5$ and $L_6$ connected in series so that when the point 1 is positive with respect to point 3, point 2 is negative and vice versa. If point 3 were directly connected to the cathodes 13, 13' of one or more electron tubes such as grid-glow tubes $V_1$ and $V_2$, it is clear that if a common A. C. supply be connected to the plates of said tubes and to signal transformer $T_1$, said tubes would be turned fully off and on oppositely by reversals in the signal voltage in $L_3$. Such a system, however, does not give satisfactory operation and it is the purpose of the present invention to supply an improved means for progressively and proportionately, and preferably also oppositely, controlling the phase positions of the voltage supplied to the grid of said tubes. To effect this purpose I introduce between point 3 and the tubes a source $c_b$ of bias voltage preferably constant in magnitude though not necessarily so and displaced in phase with respect to the plate supply to the tubes through an angle which may be, for example, 90°. Such a voltage may be readily secured by any number of known means. For instance, in Fig. 1, I have shown the bias source as comprising an auto-transformer coil 16, the center point of which is connected to the cathodes 13, 13' and to one side of the supply, one end to point 3 through resistance 17 and the other end to the other side of the line and to a condenser 17' also connected to point 3.

The points 1 and 2 of windings $L_5$ and $L_6$ are respectively connected through suitable resistances 18 and 18' to the grids 19 and 19' of said tubes to limit the grid current down through the transformer, while the plates are connected to opposing windings, such as field windings $F_1$ and F₂ of the power motor M which is also connected to the supply. It will be understood that further amplification may be interposed between the signal and transformer and T₂ as indicated by the dotted lines at 20 and also between the grids and the windings L₅ and L₆ as indicated by the dotted lines 21.

In further explanation of the operation of how my system dynamically shifts the phase on the grids of the tubes, reference is had to Figs. 2A, B and C. With no signal $e_s$ in Fig. 2A, the presence of the 90° A. C. bias voltage $e_b$ will cause tubes V₁ and V₂ to furnish equal rectified output currents $I_{p1}$ and $I_{p2}$ to their load circuit, in this case, the fields F₁ and F₂. Since these windings are opposite, the resultant fluxes $\phi_1$ and $\phi_2$ are opposite and the motor torque will be zero. The plate voltage in each diagram is represented by line $e_{p1}$ or 2. In this case each tube will be passing approximately one half its maximum rectified current. If signal voltage $e_s$ is now supplied by T₂ in one direction, the vector diagrams of Fig. 2B will apply in which the voltage across L₅ is $e_s$, and across L₆ is $e_{s2}$ and the resultant grid voltage on each tube V₁ and V₂ is represented by diagonal lines $e_{g1}$ and $e_{g2}$ respectively. The rectified outputs of the tubes are, therefore, unbalanced and are represented by output current lines $I_{p1}$ and $I_{p2}$ so that the amount and direction of the unbalance may be smoothly and progressively controlled by varying the magnitude and direction of the applied signal voltage (see Fig. 2C). Resistance 22 may be used to limit the current carried by the motor, and condensers C₁ and C₂ may be used to filter the rectified current supplied to the motor.

Fig. 3 shows a more complete diagram in which vacuum tube amplification is used between the signal transformer and the grid-glow tubes. In this case the primary winding of the supply transformer 25 is energized from one phase of the three-phase supply. There are three secondary windings 26, for heating the cathode of the amplifying valve 27, for heating the cathodes of the grid-glow tubes V₁ and V₂ and 28 for power supply to said tubes and to the motor M. The modulator or signal transformer T₁' is supplied from suitable tapping points on the three phase system which are obtained with the aid of the potentiometer 30; by this means the correct phase relation is obtained for the phase-shifting voltage, which is obtained from the modulator transformer T₁', and applied to the phase-shift transformer 31 after amplification by the vacuum tube or valve 32. The secondary of the phase shift transformer 31 consists of two separated equal windings, which may be connected together through the condenser 32' in parallel with the secondary winding 33 of the transformer 34.

Said secondary winding 33 is center tapped so that the phase-bias voltage may be fed in between this center tap and the cathodes of the grid glow tubes V₁ and V₂. The phase-bias voltage is obtained from the output of potentiometer 35 which is itself supplied with voltages by being connected across one of the three phase lines and a point on the potentiometer 36 across the other pair of lines. The phase bias voltage is thus adjustable in phase by the potentiometer 36 and in magnitude by the potentiometer 35.

In this figure I have also shown a means for maintaining a tremor or hunting action in the follow-up system which has certain advantages, especially for gyro compass follow-up systems. For this purpose the motor is maintained in a state of slight oscillation by means hereinafter described which injects voltages into the phase shift transformer of the right nature to produce oscillations.

The current through tubes V₁ and V₂ will vary at the low frequency at which oscillations of the motor are taking place. This current has a D. C. and an A. C. component. The varying current has, therefore, a low frequency component and a component of supply frequency modulated at low frequency. When tube V₁ is passing a high current, tube V₂ is passing a low one. There will, therefore, be a difference of potential between the anodes which will have a low frequency component and a supply frequency component modulated at low frequency. Both will be applied to transformer 34 and will, therefore, affect the circuit 32', 33. The modulated supply frequency is of the right type to shift the phase of the grid voltages and, therefore, to cause the tubes to maintain the oscillations of the motor. The whole action is, therefore, self-sustaining and does not require any external sources for voltages in the phase-shift circuit. The low frequency component also affects the output of the tubes to some extent, so that there is a general retroaction or regenerative effect by which the tuned circuit 32', 33 controls the frequency of operation and, therefore, the frequency at which oscillations of the motor occur.

It is obvious that a duplicate circuit for full wave rectification could be provided, if desired, and also that the phase shifting principles of my invention may be applied to a single tube as well as to a pair of tubes.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a positional or follow-up control system for a reversible motor for positioning a driven object with respect to the position of a controlling member, means operated by said controlling member for producing an alternating E. M. F. varying in sense and in amount in accordance with the relative position of the controlling member and driven object, means for combining the E. M. F. with another alternating E. M. F. of different phase to form a resultant variable phase E. M. F., and means for applying the said resultant between the grid and cathode of at least one grid-glow tube, forming part of a balanced circuit arrangement, for shifting the phase of the E. M. F. applied to the grid of the grid glow tube relative to the alternating E. M. F. applied to the anode, and means for adapting the output of said grid-glow tube arrangement to drive the said motor in either direction for positioning the driven object, and coupling means included between the output and input of said tube for maintaining a tremor in said motor.

2. A system according to claim 1 wherein the grid glow tube arrangement comprises a pair of circuitally balanced grid-glow tubes to the grids of which are applied two variable alternating E. M. F.'s under the control of the controlling member, vectorially at right angles to an added phase-bias voltage of different phase said phase-bias voltage being supplied to said tubes in the same phase relation.

3. Means for driving an object into positional agreement with a controlling object comprising an inductive device, means operated by said controlling object for producing an electromotive force in said inductive device varying in direction and amount in accordance with the movements of said driven object, a pair of grid-glow tubes, a coupling transformer between said second means to supply opposite phases on the grids of said tubes, means for combining each output of said transformer with a substantially fixed voltage having substantially 90° bias for supplying differentially shifting phases to said grids with respect to their plates, a reversible motor driven by the output of said tubes for driving said driven object, and a regenerative coupling responsive to the output of said tubes and connected to the grids of said tubes for maintaining a tremor in said motor.

4. In a follow-up system for gyro compasses and the like, a control device, the output of which varies in magnitude and direction with departure of the follow-up from the sensitive element, a pair of grid-glow tubes, a coupling transformer between said second means to supply opposite phases on the grids of said tubes, means for combining each output of said transformer with a substantially fixed voltage having substantially 90° bias for supplying oppositely shifting phases to said grids with respect to their plates, and a reversible motor driven by the output of said tubes for driving said follow-up element and a regenerative coupling for maintaining an oscillatory phase shift of small magnitude to maintain a tremor in said motor.

5 In a positional or follow-up system for governing the speed and direction of a power motor from the output of a pair of glow tubes in accordance with the movements of a control member, the combination with an A. C. supply, an inductive device on said member powered from said supply, the output of which is governed in magnitude and sign by the position of said member, a pair of grid glow tubes also powered from said supply, and a transformer having its primary winding connected to said inductive device and the ends of its secondary winding respectively connected to the grids of said tubes for proportionally and oppositely shifting the phases on the grids with respect to that on the plates in accordance with the magnitude and sign of the output signal characterized by means for deriving a bias phase voltage for application in the same phase relation to both of said tubes, and means for supplying the grids with the combined bias voltages and signal.

6. In a positional or follow-up system for governing the speed and direction of a power motor from the output of a pair of grid glow tubes in an A. C. circuit, a single phase A. C. supply, an inductive device powered from said supply, the output of which is varied in magnitude and direction, a transformer for inducing a pair of opposite voltages therefrom, impedance means connected to said supply for creating a substantially 90° bias voltage for application in the same phase relation to both said tubes, and means for combining the same with said signal opposite voltages and applying the same respectively to the grids of said tubes.

7. In a positional or follow-up system for governing the speed and direction of rotation of a motor from the output of a pair of electron tubes by graduated phase shift of the voltage on the grids in an A. C. circuit from an inductive device adapted to produce a signal of variable magnitude characterized by combining with the signal voltage a substantially fixed voltage for application to the grids of both tubes in the same phase relation, said fixed voltage having a substantial phase displacement with respect to said signal voltage and supplying the resultant voltage to the grids of said tubes.

8. In a device for driving an object into positional agreement with a controlling object, comprising a two part inductive device in which the balance between electromotive forces of opposite phase is disturbed in one direction or the other by relative movement of said objects, a pair of grid glow tubes having their inputs or grid circuits connected respectively to the opposite parts of said device and also having output circuits, means for combining a fixed voltage with each input having a substantial phase displacement with respect to the signal voltages, said fixed voltage being applied to both of said grid glow tubes in the same phase relation, and reversible motive means controlled by the output of said tubes.

FRANCIS L. MOSELEY.